US012112635B2

(12) United States Patent
Peranadam et al.

(10) Patent No.: US 12,112,635 B2
(45) Date of Patent: Oct. 8, 2024

(54) PROCESS AND SYSTEM FOR LOCAL TRAFFIC APPROXIMATION THROUGH ANALYSIS OF CLOUD DATA

(71) Applicant: GM GLOBAL TECHNOLOGY OPERATIONS LLC, Detroit, MI (US)

(72) Inventors: Prakash Mohan Peranadam, Troy, MI (US); Mohamed A. Layouni, Warren, MI (US); Meng Jiang, Rochester Hills, MI (US); Shengbing Jiang, Rochester Hills, MI (US); Jiyu Zhang, Sterling Heights, MI (US); Erik B. Golm, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 619 days.

(21) Appl. No.: 16/794,884

(22) Filed: Feb. 19, 2020

(65) Prior Publication Data
US 2021/0256849 A1     Aug. 19, 2021

(51) Int. Cl.
G08G 1/16 (2006.01)
G06N 20/00 (2019.01)
G08G 1/01 (2006.01)
H04W 64/00 (2009.01)

(52) U.S. Cl.
CPC ............. *G08G 1/162* (2013.01); *G06N 20/00* (2019.01); *G08G 1/0112* (2013.01); *G08G 1/012* (2013.01); *G08G 1/166* (2013.01); *H04W 64/006* (2013.01)

(58) Field of Classification Search
CPC ...... G08G 1/162; G08G 1/166; G08G 1/0112; G08G 1/012; G06N 20/00; H04W 64/006
USPC ........................................................ 701/117
See application file for complete search history.

(56) References Cited

U.S. PATENT DOCUMENTS

| | | | | |
|---|---|---|---|---|
| 10,055,985 | B1* | 8/2018 | Hayward | G01C 21/3415 |
| 2012/0276847 | A1* | 11/2012 | Peterson | H04W 4/027 |
| | | | | 455/41.2 |
| 2017/0097243 | A1* | 4/2017 | Ricci | H04L 63/102 |
| 2019/0250639 | A1* | 8/2019 | Xu | G08G 1/096725 |
| 2019/0384294 | A1* | 12/2019 | Shashua | G05D 1/0253 |
| 2021/0012116 | A1* | 1/2021 | Urtasun | G06V 20/58 |
| 2021/0065541 | A1* | 3/2021 | Koshizen | G08G 1/0133 |
| 2022/0227367 | A1* | 7/2022 | Kario | B60W 30/0956 |

FOREIGN PATENT DOCUMENTS

CN          108765954 A    * 11/2018   ........... G06K 9/6223

OTHER PUBLICATIONS

Chen Bin, The road traffic safety situation monitoring method of clustering algorithm is improved based on SNN density ST-Optics, 2018) (Year: 2018).*

* cited by examiner

*Primary Examiner* — James M McPherson
*Assistant Examiner* — Bakari Underwood
(74) *Attorney, Agent, or Firm* — Quinn IP Law

(57) ABSTRACT

A process for local traffic approximation through analysis of cloud data is provided. The process includes, within a computerized traffic flow estimation controller of a host vehicle, operating programming to monitor a planned navigational route of the host vehicle, identify along the planned navigational route a road section including cross-traffic, monitor cloud data related to a mobile cellular device, analyze the cloud data to identify traffic posing a hazardous condition to the host vehicle within the road section, and generate a vehicle alert to a driver of the host vehicle based upon the identified traffic.

20 Claims, 9 Drawing Sheets

PROCESS AND SYSTEM FOR LOCAL TRAFFIC APPROXIMATION THROUGH ANALYSIS OF CLOUD DATA

INTRODUCTION

The disclosure generally relates to a process and system for local traffic approximation through analysis of cloud data, and, in particular, a process and system for hidden vehicle estimation and alerting.

Vehicle sensors and available information may be utilized to provide or augment data to a driver of a vehicle regarding an environment around the vehicle. Sensors such as a camera device, radar device, or a light detection and ranging (LIDAR) device may gather information. Navigational databases may be maintained and useful to provide information about a section of roadway. Global positioning system (GPS) data may be accessed and provided to identify a current location for the vehicle. GPS data may include data gathered from satellite positioning processes. GPS data may include data gathered through cellular tower triangulation processes or similar processes. Navigational aids such as route planning software may project a proposed route to a destination and may track progress of the vehicle to the destination.

Navigation systems and methods for autonomous and semi-autonomous vehicle utilize computerized algorithms to determine a navigational path for the vehicle being controlled. Digital maps and sensor inputs are useful to set the navigational path for the vehicle. Lane boundaries are not always directly determinable.

SUMMARY

A process for local traffic approximation through analysis of cloud data is provided. The process includes, within a computerized traffic flow estimation controller of a host vehicle, operating programming to monitor a planned navigational route of the host vehicle, identify along the planned navigational route a road section including cross-traffic, monitor the cloud data related to a mobile cellular device, analyze the cloud data to identify traffic posing a hazardous condition to the host vehicle within the road section, and generate a vehicle alert to a driver of the host vehicle based upon the identified traffic.

In some embodiments, monitoring the cloud data includes monitoring global positioning system data for the mobile cellular device, and analyzing the cloud data includes identifying a hidden vehicle approaching the road section based upon movement of the mobile cellular device identified through the cloud data.

In some embodiments, monitoring the cloud data includes monitoring roaming cellular data acquired from a plurality of cellular towers, and analyzing the cloud data includes identifying a hidden vehicle approaching the road section based upon movement of the mobile cellular device identified through the cloud data.

In some embodiments, identifying the hidden vehicle approaching the road section based upon the movement of the mobile cellular device includes estimating a speed of the mobile cellular device based upon a frequency that the mobile cellular device switches between the plurality of cellular towers.

In some embodiments, analyzing the cloud data to identify the traffic posing the hazardous condition includes determining a number of vehicles approaching the road section.

In some embodiments, analyzing the cloud data to identify the traffic posing the hazardous condition includes filtering out data related to a pedestrian not posing the hazardous condition to the host vehicle.

In some embodiments, analyzing the cloud data to identify the traffic posing the hazardous condition includes filtering out redundant data related to a plurality of mobile cellular devices collocated in a single hidden vehicle.

In some embodiments, the process further includes operating programming to monitor data from an on-board sensor of the host vehicle and compare the data from the on-board sensor of the host vehicle to the cloud data. In some embodiments, generating the vehicle alert to the driver of the host vehicle is further based upon the comparing indicating that the cloud data is related to a hidden vehicle obscured from the on-board sensor.

In some embodiments, the process further includes operating programming to command autonomous braking based upon the vehicle alert.

In some embodiments, analyzing the cloud data to identify the traffic posing the hazardous condition includes analyzing the cloud data to identify a hidden vehicle approaching the road section, calculating a time to meet for the hidden vehicle and the host vehicle, and identifying the hidden vehicle as posing the hazardous condition based upon the time to meet.

In some embodiments, analyzing the cloud data to identify the traffic posing the hazardous condition includes applying a machine learning algorithm to estimate traffic intensity for the road section.

In some embodiments, the process further includes operating programming to warn the driver based upon the estimated traffic intensity for the road section.

According to one alternative embodiment, a process for local traffic approximation through analysis of cloud data is provided. The process includes, within a computerized traffic flow estimation controller of a host vehicle, operating programming to monitor a planned navigational route of the host vehicle, identify along the planned navigational route a road section including cross-traffic, monitor the cloud data related to a mobile cellular device. The cloud data includes one of global positioning service data or roaming cellular data acquired from a plurality of cellular towers. The process further includes operating programming to analyze the cloud data to identify a hidden vehicle posing a hazardous condition to the host vehicle within the road section and generate a vehicle alert to a driver of the host vehicle based upon the hidden vehicle.

In some embodiments, analyzing the cloud data to identify the hidden vehicle posing the hazardous condition includes filtering out data related to a pedestrian not posing the hazardous condition to the host vehicle.

In some embodiments, analyzing the cloud data to identify the hidden vehicle posing the hazardous condition includes filtering out redundant data related to a plurality of mobile cellular devices collocated in a single hidden vehicle.

In some embodiments, analyzing the cloud data to identify the hidden vehicle posing the hazardous condition includes applying a machine learning algorithm to estimate traffic intensity for the road section.

According to one alternative embodiment, a system for local traffic approximation through analysis of cloud data is provided. The system includes a computerized traffic flow estimation controller of a host vehicle operating programming to monitor a planned navigational route of the host vehicle, identify along the planned navigational route a road section including cross-traffic, monitor the cloud data related to a mobile cellular device, analyze the cloud data to identify traffic posing a hazardous condition to the host vehicle within the road section, and generate a vehicle alert to a driver of the host vehicle based upon the identified traffic.

In some embodiments, the system further includes an on-board sensor of the host vehicle operable to provide data related to an environment around the host vehicle. In some embodiments, the computerized traffic flow estimation controller further includes programming to monitor data from the on-board sensor, compare the data from the on-board sensor to the cloud data, and identify a hidden vehicle based upon the comparing indicating that the hidden vehicle is obscured from the on-board sensor.

In some embodiments, the programming to monitor the cloud data related to a mobile cellular device includes programming to monitor global positioning service data.

In some embodiments, the programming to monitor the cloud data related to a mobile cellular device includes programming to monitor roaming cellular data acquired from a plurality of cellular towers.

The above features and advantages and other features and advantages of the present disclosure are readily apparent from the following detailed description of the best modes for carrying out the disclosure when taken in connection with the accompanying drawings.

DETAILED DESCRIPTION

A process and system for local traffic approximation through analysis of cloud data is provided. Electronic devices utilize cellular networks to acquire, access, transmit, exchange, and otherwise utilize information available through the Internet and remote server devices. The Internet, remote servers, and other widely available sources of data available through wireless communication are collectively known as "the cloud." Cloud data is information that may be acquired through the cloud. Cloud data may include individual devices using and providing GPS data through the cloud. Cloud data may additionally or alternatively include individual devices using and providing cellular roaming data through cellular towers. By analyzing cloud data, traffic including the presence of particular quantities of vehicles or individual vehicles in a particular road section may be estimated. In another embodiment, traffic including the presence of pedestrians, trains, domesticated animals, and other similar objects in a particular road section may be estimated. As described herein, a mobile cellular device may include a cellular telephone or smart phone; a tablet, laptop, or other similar device operable to communicate over a wireless network; a motor vehicle including a wireless network connection and resident computerized functionality; the electronics in such an equipped motor vehicle; or another similar device.

Figure 1:
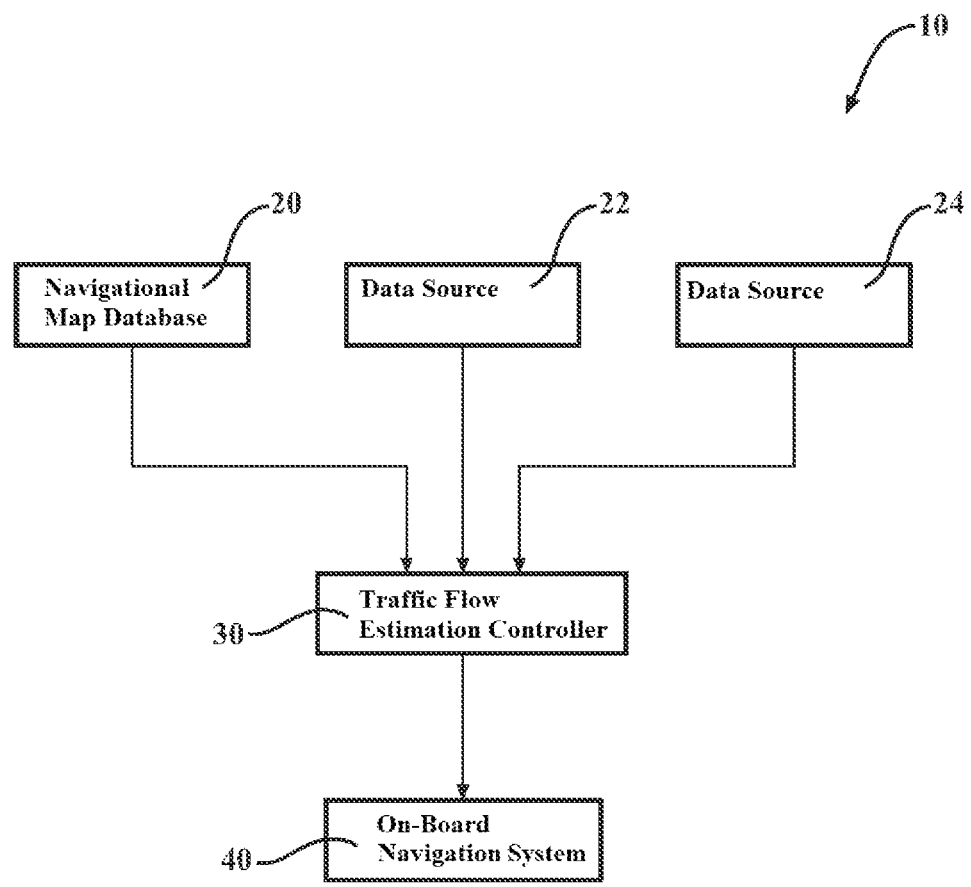
FIG. 1 schematically illustrates an exemplary traffic flow estimation controller monitoring data from various sources and providing an estimate of a number of vehicles approaching a particular roadway section, in accordance with the present disclosure.

FIG. 1 schematically illustrates an exemplary traffic flow estimation controller 30 monitoring data from various sources and providing an estimate of traffic approaching or within a particular roadway section. A traffic flow estimation system 10 is illustrated including the traffic flow estimation controller 30. The traffic flow estimation controller 30 is a computerized device including a processor and programming operable to monitor inputs and approximate traffic for a road section. The road section may include a current road section of the vehicle equipped with the traffic flow estimation controller 30, a road section that the vehicle is approaching, or a traffic section along a planned travel route of the vehicle. The vehicle equipped with the traffic flow estimation controller 30 may be referred to herein as the host vehicle. A number of alternative inputs may be monitored by the traffic flow estimation controller 30. A navigational map database 20 is illustrated providing local road geometries as an input to the traffic flow estimation controller 30. A data source 22 is illustrated providing cloud data related to nearby electronic devices providing GPS data regarding a location and movement of the electronic devices. A data source 24 is illustrated providing cloud data related to nearby cellular devices providing cellular roaming data to nearby cellular towers. The traffic flow estimation controller 30 receives data from each of the navigational map database 20, the data source 22, and the data source 24 and generates an estimate of traffic approaching or currently within the roadway section. The estimate may include a quantification of vehicles in the area, speeds of the vehicles in the area, trajectories of vehicles in the area, presence and movement of pedestrians, trains, construction equipment, domesticated animals wearing cellular device equipped collars, and other similar information. This estimate produced by the traffic flow estimation controller 30 is provided to an on-board navigation system 40 operable to control movement of the vehicle and/or provide a warning to a driver of the vehicle.

Figure 2:
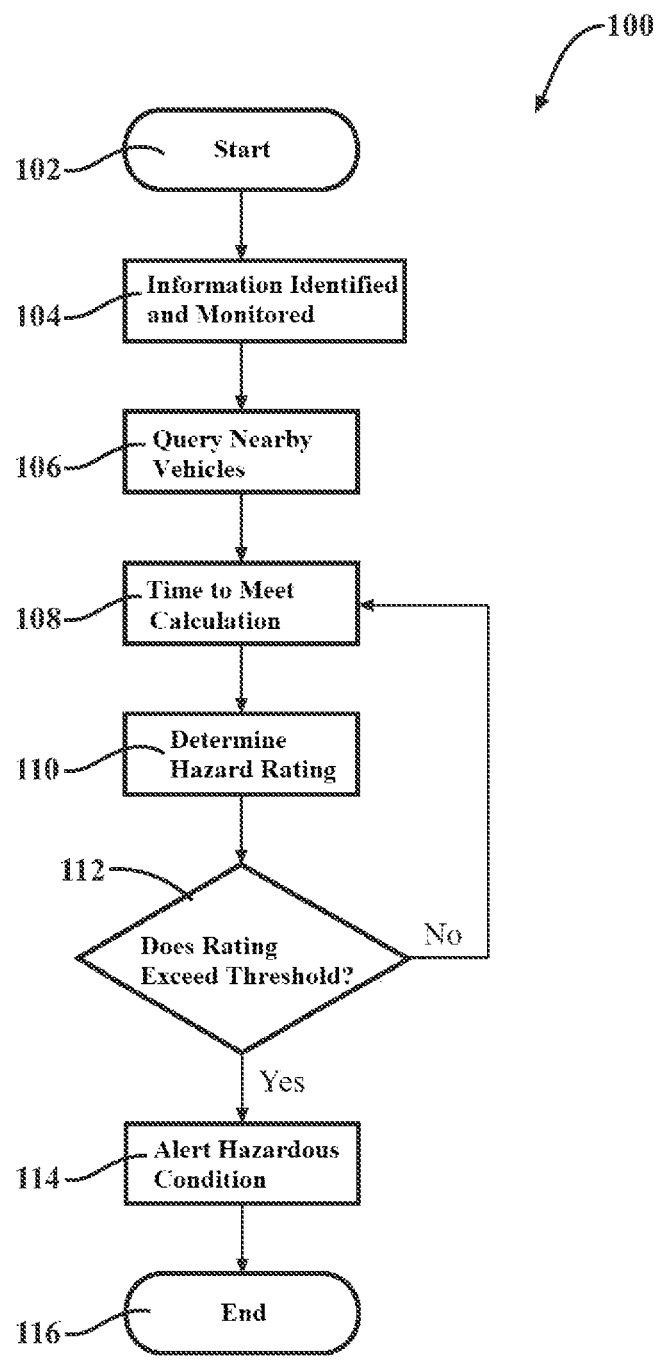
FIG. 2 is a flowchart illustrating an exemplary process to estimate or approximate traffic for a roadway section based upon cloud-based GPS data, in accordance with the present disclosure.

FIG. 2 is a flowchart illustrating an exemplary process to estimate or approximate traffic for a roadway section based upon cloud-based GPS data. Process 100 starts at step 102. At step 104, information related to road section of interest is identified and monitored. This information may include GPS data, map data, and navigational data. This information may further include data from sensors on or nearby the vehicle, for example, including camera data, radar data, LIDAR data, and ultrasonic data. The road section of interest may include a section of roadway where traffic may merge, may include cross-traffic, or may include a risk of a hazardous condition wherein traffic may interfere with a desired navigational path of the host vehicle. At step 106, an optional step may be operated wherein nearby vehicles equipped with a cooperative or proprietary computerized system operable to share navigational data may be queried to acquire detailed data for such vehicles, including planned navigational routes, detailed trajectories, and sensor data including data regarding objects sensed around the other vehicles. At step 108, a time to meet calculation is performed for every vehicle and object approaching the road section. The time to meet calculation may be based upon obtained data related to each vehicle and object and data related to the position and movement of the host vehicle. A time to meet calculation may alternatively be described as a time to intercept calculation or as a time to close calculation.

According to one embodiment, a time to meet calculation may include definition of and projecting movement of a zone around the host vehicle and similar zones around each vehicle and object approaching or within the road section. A time to meet calculation may include a determination of when the zone around the host vehicle is likely to overlap with a zone around each vehicle and object approaching or within the road section. According to one embodiment, a zone around the host vehicle and zones around vehicles and objects approaching or within the road section may include a two meter space around a boundary of the vehicle or object. According to one embodiment, an approximate speed and direction of travel of the host vehicle and other vehicles may be estimated based on local road signs and traffic laws. Current traffic conditions can also be considered for time to meet calculation, for example, including a current speed or an estimated average speed traffic within the road section. In one embodiment, time to meet calculations may be iteratively determined, for example, once per second.

At step 110, for each vehicle and object approaching or within the road section, a hazard rating is determined based upon the time to meet calculation for the vehicle or object. At step 112, each hazard rating is compared to a calibrated threshold. The calibrated threshold may be adjusted for factors such as speed of host vehicle, speed of other vehicles, likelihood that other vehicles are breaking or have broken traffic laws, weather conditions, presence of construction zones, and other similar factors. If the hazard rating exceeds the calibrated threshold, a vehicle alert may be generated and the process 100 proceeds to step 114 where the driver and/or autonomous driving system are alerted of a hazardous condition. If the hazard rating does not exceed the calibrated threshold, the process 100 returns to step 108 where time to meet calculations are reiterated. At step 116, the process 100 ends. The process 100 is provided as an example of a process to estimate or approximate traffic for a roadway section based upon cloud-based GPS data. A number of alternative steps are envisioned, and the disclosure is not intended to be limited to the examples provided herein.

Figure 3:
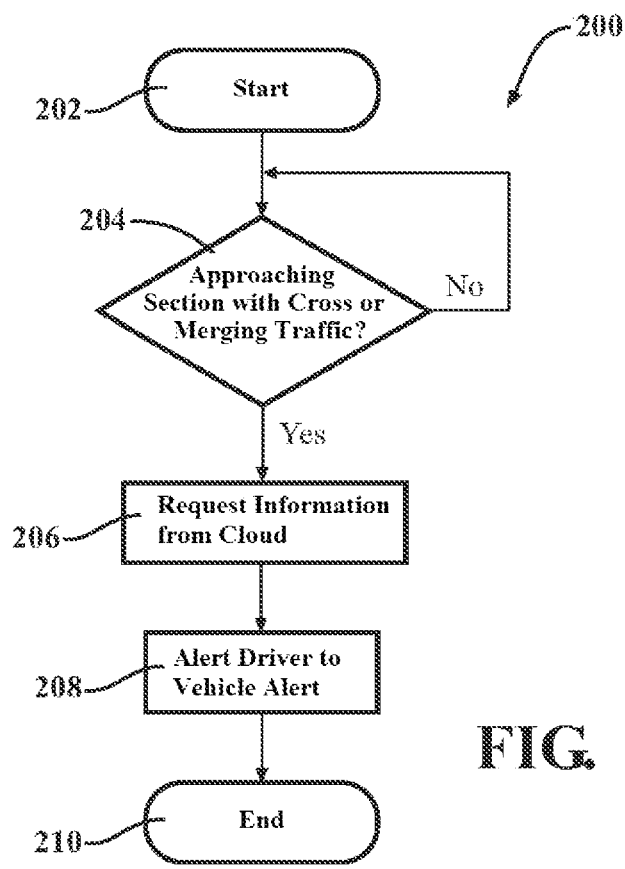
FIG. 3 is a flowchart illustrating an exemplary process whereby an on-board navigation system may utilize the approximated traffic to warn a driver of a potentially hazardous condition, in accordance with the present disclosure.

FIG. 3 is a flowchart illustrating an exemplary process whereby an on-board navigation system 40 may utilize the approximated traffic to warn a driver of a potentially hazardous condition. Process 200 starts at step 202. At step 204, a determination is made whether the host vehicle is approaching an intersection or other section of roadway wherein an increased hazard due to cross-traffic or merging traffic is likely. If the answer is no, the process 200 reiterates step 204 to continue to attempt to identify a road section wherein traffic estimation would be useful. If the answer is yes, the intersection or section of roadway is identified as a road section for which traffic is to be estimated and the process 100 advances to step 206. At step 206, vehicle alert information is requested from a cloud network. Vehicle alert information may include a warning that a vehicle may be operating nearby that poses a hazard to the host vehicle. At step 208, the driver of the vehicle is alerted to the vehicle alert information. Alerting the driver of the vehicle may include an audio and/or haptic and/or visual alert to the driver. Alerting the driver of the vehicle may additionally or alternative include autonomous braking or other autonomous navigation of the vehicle. At step 210, the process 200 ends. The process 200 is provided as an example of a process whereby an on-board navigation system 40 may utilize the approximated traffic to warn a driver of a potentially hazardous condition. A number of alternative steps are envisioned, and the disclosure is not intended to be limited to the examples provided herein.

Figure 4:
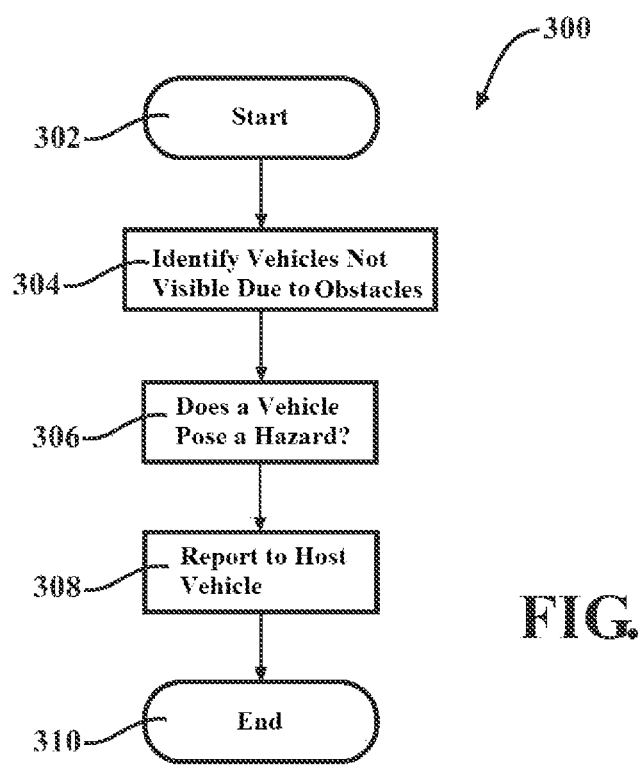
FIG. 4 is a flowchart illustrating an exemplary sub-process whereby a computerized controller may request a vehicle alert from a cloud network, in accordance with the present disclosure.

FIG. 4 is a flowchart illustrating an exemplary sub-process whereby a computerized controller may request a vehicle alert from a cloud network. Sub-process 300 may be an embodiment of the step 206 of the process 200. Sub-process 300 may be performed by a remote computerized server device and starts at step 302. At step 304, vehicles near an identified road section that are not visible for visualization sensors (ex: camera, LIDAR/RADAR) due to obstacles are identified using cloud data. For each vehicle, a direction of travel and a speed are determined or estimated. Such determinations or estimations may be based upon GPS data and/or other data regarding a route of travel, such as a speed of transitions between cellular towers near the road section. At step 306, a determination is made whether one of the identified vehicles pose a hazard to the host vehicle. At step 308, data and/or determinations made regarding the vehicle may be reported back to the host vehicle. At step 310, the process 300 ends.

Figure 5:
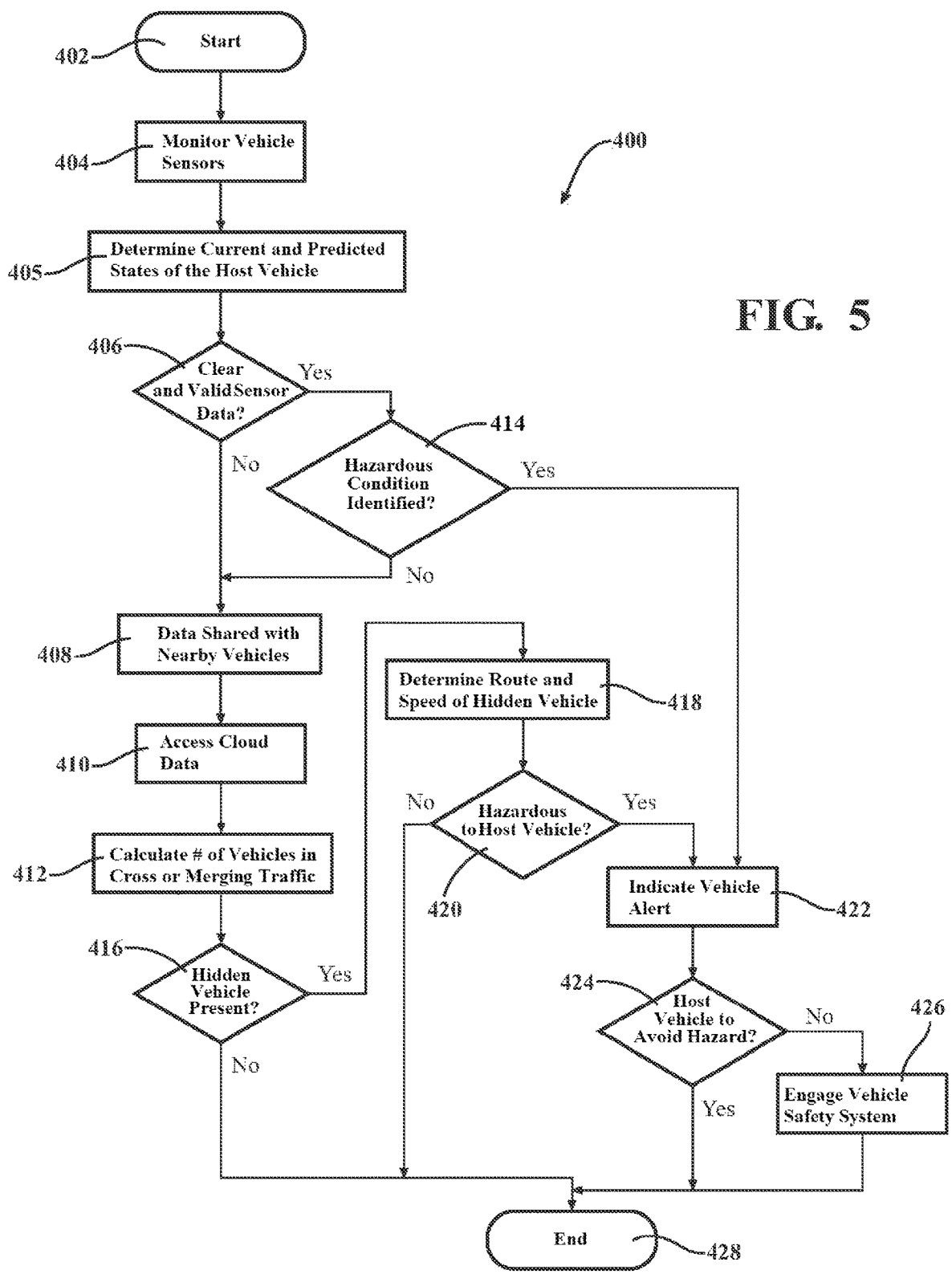
FIG. 5 is a flowchart illustrating an exemplary process to avoid a hazardous condition with another vehicle based upon data from a cloud network, in accordance with the present disclosure.

FIG. 5 is a flowchart illustrating an exemplary process to avoid a hazardous condition with another vehicle based upon data from a cloud network. Process 400 starts at step 402. At step 404, vehicle sensors are monitored. At step 405, a current state and a predicted state for the host vehicle are determined based upon the monitored sensors. The current state and predicted state may each include a vehicle speed. Other indications may additionally be monitored or determined and included in the current state and predicted state, for example, including a planned navigational route, turn signals, exit lane only lane markings, driver gaze sensors, and steering wheel orientation. The predicted state includes a determination that the host vehicle is going to traverse a road section with cross-traffic and/or merging traffic. At step 406, a determination is made whether the on-board sensors (e.g., camera device, radar device, LIDAR device, etc.) are providing clear and valid data. If the on-board sensors are providing clear and valid data, the process 400 proceeds to step 414. If the on-board sensors are not providing clear and valid data, the process proceeds to step 408.

At step 414, a determination is made whether on-board sensors identify a hazardous condition for the host vehicle. If a hazardous condition is identified, the process 400 advances to step 422. If the on-board sensors fail to identify a hazardous condition, the process 400 advances to step 408.

At step 408, data regarding the host vehicle and data from the on-board sensors of the host vehicle are shared with nearby vehicles through the cloud. Step 408 may be performed iteratively and/or constantly while the host vehicle is in operation. At step 410, the host vehicle accesses data from the cloud on nearby vehicles. The accessed data may include location and driving route information for each of the nearby vehicles. The accessed data may additionally include data from the on-board sensors of the nearby vehicles. At step 412, the host vehicle calculates a number of vehicles approaching and within the road section including cross-traffic and/or merging traffic. At step 416, a determination is made whether the number of vehicles calculated in step 412 indicates presence of a nearby hidden vehicle not detected by on-board sensors. If no hidden vehicle is indicated, the process 400 advances to step 428. If a hidden vehicle is indicated, the process 400 advances to step 418. Additionally, if a hidden vehicle is indicated, as an optional step, a hidden vehicle alert may be indicated to the driver of the host vehicle. At step 418, a route and speed of the hidden vehicle is determined based upon data available from the cloud. At step 420, a determination is made whether the determined rout and speed of the hidden vehicle indicate that the hidden vehicle poses a hazardous condition to the host vehicle. If the hidden vehicle is indicated to not pose a hazardous condition to the host vehicle, the process advances to step 428. If the hidden vehicle is indicated to pose a hazardous condition to the host vehicle, the process advances to step 422.

At step 422, a vehicle alert is indicated. A vehicle alert may include a visual and/or audio indication to a driver of the host vehicle that a hidden vehicle poses a hazardous condition to the host vehicle. The vehicle alert may include instructions to an autonomous or semi-autonomous vehicle control system to enable the vehicle control system to avoid the hidden vehicle. The vehicle alert may include other commands or alert messages that may be initiated to aid in avoiding the hazardous condition posed by the host vehicle. At step 424, operation of the vehicle and driver inputs to the vehicle are monitored. If the monitored information indicates that the host vehicle is in a condition to avoid the hazardous condition posed by the hidden vehicle, the process advances to step 428. If the monitored information indicates that the host vehicle is not in a condition to avoid the hazardous condition posed by the hidden vehicle, a vehicle safety system is engaged at step 426 to avoid the hazardous condition. The vehicle safety system may include autonomous braking, autonomous steering, an autonomous lane change, or other similar operation. The process 400 then advances to step 428, where the process ends. The process 400 may be repeated or iterated, for example, every time the host vehicle approaches a road section with cross-traffic and/or merging traffic. The process 400 is exemplary. A number of alternative steps are envisioned, and the disclosure is not intended to be limited to the examples provided herein.

Figure 6:
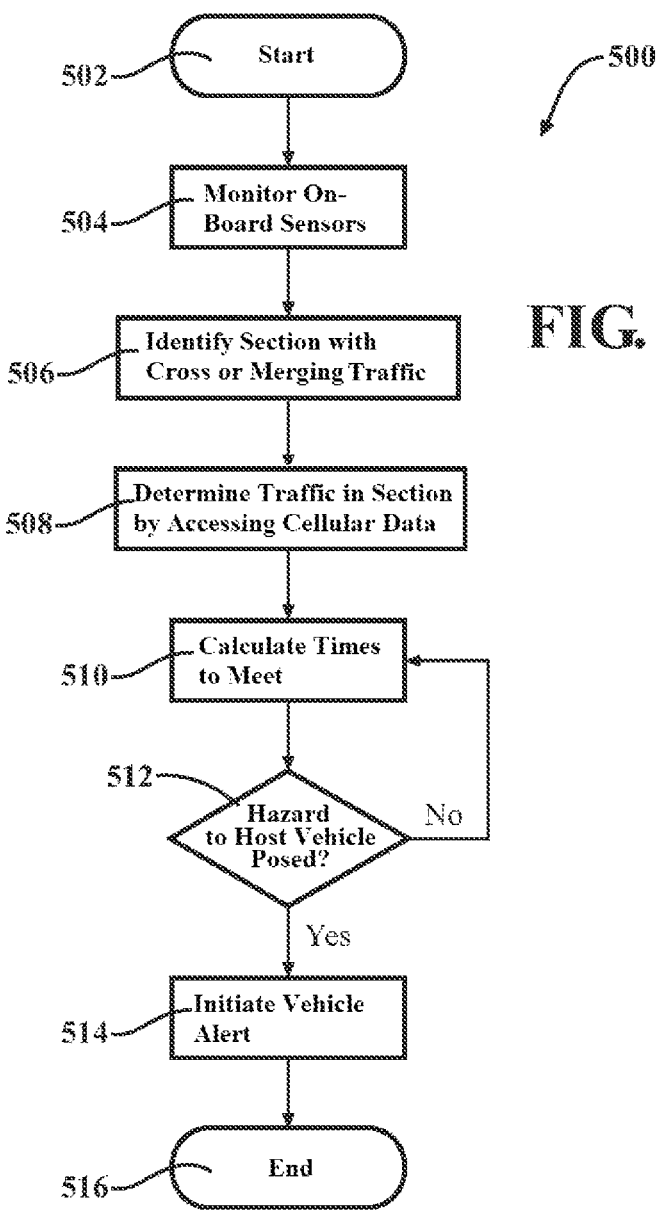
FIG. 6 is a flowchart illustrating an exemplary process to avoid a hazardous condition based upon data related to roaming mobile based sensing system, in accordance with the present disclosure.

FIG. 6 is a flowchart illustrating an exemplary process to avoid a hazardous condition based upon data related to roaming mobile based sensing system. Process 500 starts at step 502. At step 504, data from on-board sensors of a host vehicle are monitored. At step 506, the monitored sensor data is combined with data from GPS, digital map database, and navigation systems to identify a road section with cross-traffic and/or merging traffic that the host vehicle is approaching. At step 508, cloud data related to mobile cellular devices accessing local cellular towers is accessed, and a determination is made whether each mobile cellular device represents traffic approaching or within the road section. At step 510, a time to meet calculation is performed for each mobile cellular device determined to represent traffic approaching or within the road section. The time to meet calculation of the step 510 is similar to the time to meet calculation described in relation to the process 100 of FIG. 2. At step 512, the time to meet calculation for each mobile cellular device is analyzed to determine a hazard posed to the host vehicle. If none of the mobile cellular devices include a hazard posed to the host vehicle exceed the calibrated threshold, the process 500 returns to step 508, and data regarding mobile cellular devices are continuously or iterative monitored until the host vehicle passes through the road section. If the hazard posed to the host vehicle for a mobile cellular device is determined to exceed a calibrated threshold, a vehicle alert is initiated at step 514. The process 500 ends at step 516. The process 500 is exemplary. A number of alternative steps are envisioned, and the disclosure is not intended to be limited to the examples provided herein.

Figure 7:
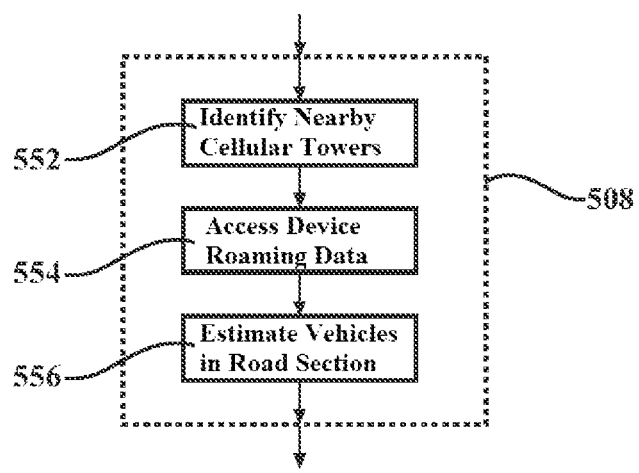
FIG. 7 is a flowchart illustrating an exemplary sub-process utilizing relevant cellular tower data to evaluate roaming mobile data, in accordance with the present disclosure.

FIG. 7 is a flowchart illustrating an exemplary sub-process utilizing relevant cellular tower data to evaluate roaming mobile data. FIG. 7 illustrates an embodiment of the step 508 of FIG. 6, wherein cloud data related to mobile cellular devices accessing local cellular towers is accessed, and a determination is made whether each mobile cellular device represents traffic approaching or within the road section. Step 552 includes, for a particular road section being approached by the host vehicle, identifying nearby cellular towers that may provide relevant data related to mobile cellular devices in the area. Information for the cellular towers may include distance between the towers and relative time to switch roaming data connections between the pre-determined set of towers in an order for that specific road section. Step 554 includes accessing data related to mobile cellular devices utilizing the cellular towers to access roaming data. The accessed data may be analyzed and filtered, for example, filtering out multiple cellular devices with identical recent historical behaviors, indicating that the mobile cellular devices indicate multiple passengers in a single vehicle. Additionally, a speed of each mobile cellular device may be determined or inferred based upon a frequency of cellular tower change. At step 556, analysis and filtered data from step 554 may be used to estimate and order vehicles approaching or within the road section being approached by the host vehicle.

Figure 8:
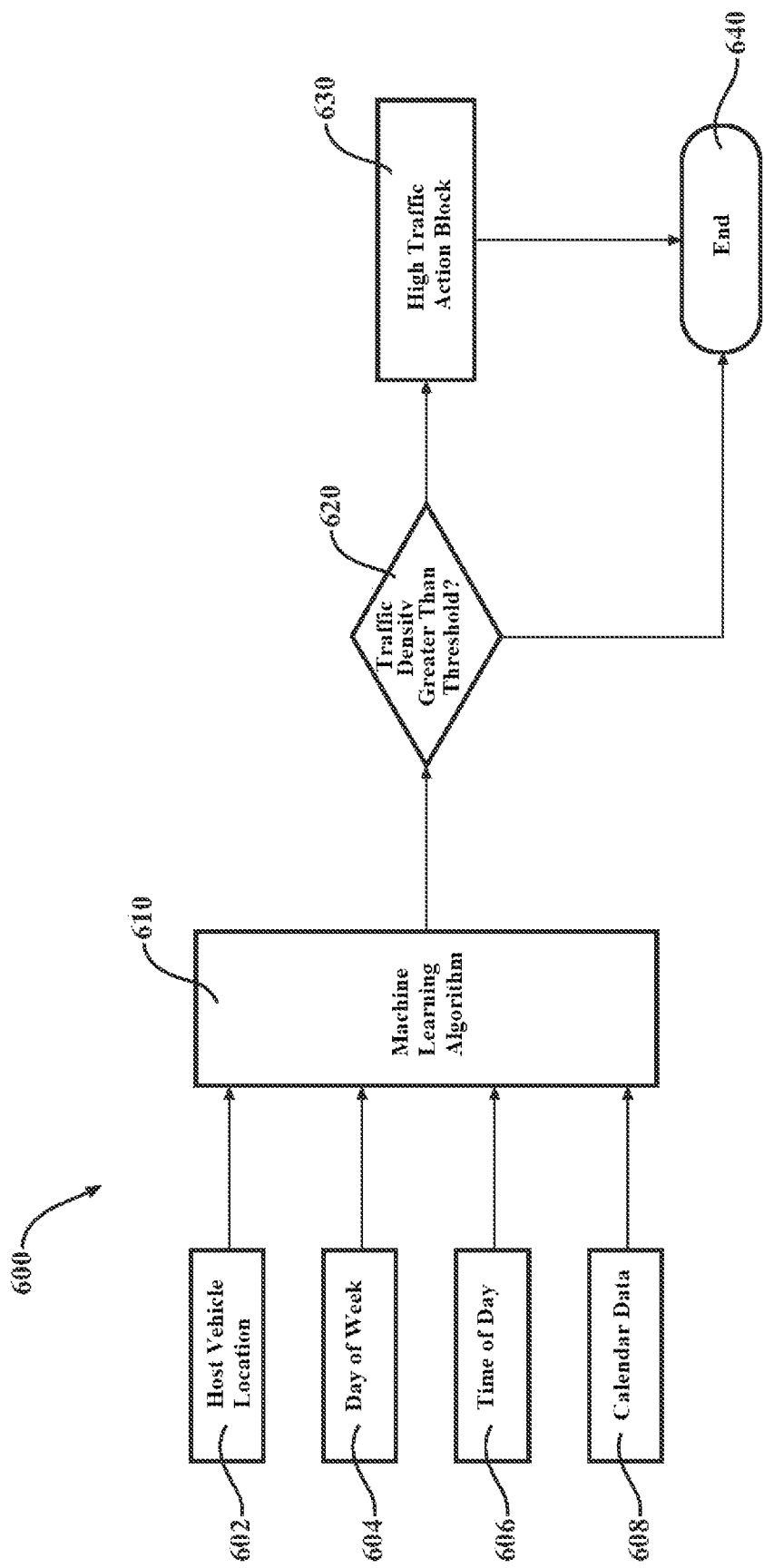
FIG. 8 schematically illustrates a process flow including a machine learning algorithm being utilized to improve accuracy of a process to approximate traffic based upon cloud data, in accordance with the present disclosure.

In one embodiment, a machine learning algorithm may be utilized to refine operation of the disclosed process and improve accuracy of the vehicle alerts generated. FIG. 8 schematically illustrates an exemplary process flow 600 including a machine learning algorithm 610 being utilized to improve accuracy of a process to approximate traffic based upon cloud data. The process flow 600 illustrates a flow of data and determinations made within a computerized controller such as traffic flow estimation controller 30. A data source 602 provides a location of a host vehicle. A data source 604 provides a day of the week. A data source 606 provided a time of day. A data source 608 provides a calendar of date specific occasions (e.g., holidays, local sporting events, rush hour data, etc.) The machine learning algorithm 610 is provided that monitors data from each of the data source 602, the data source 604, the data source 606, and the data source 608. The machine learning algorithm 610 may be a part of a larger program operable to approximate traffic for a road section including cross-traffic and/or merging traffic. In the alternative, the machine learning algorithm 610 may be a stand-alone program providing an input to a second program operable to approximate traffic for the road section. The machine learning algorithm 610 provides and iterative updates an estimate of traffic intensity for a road section. For instance, the machine learning algorithm 610 may provide an estimate of traffic intensity on a Monday morning that traffic is relatively heavy and traffic on a Sunday afternoon is relatively light based upon expected rush hour and working schedule traffic flows for the population. The machine learning algorithm 610 includes weighted factors in its programmed determinations, with the weighted factors being changeable over time based upon a comparison of expected output versus measured actual results. For example, Monday morning traffic may be lighter than expected based upon a newly declared bank holiday, and Sunday afternoon traffic may be heavier than expected due to a new sport stadium being built in the area. By comparing expected output to measured actual results and adjusting weighted factors of the machine learning algorithm 610 accordingly, the estimation of traffic intensity provided by the machine learning algorithm 610 may be improved and made more accurate over time. In the embodiment of FIG. 8, the estimation of traffic intensity is provided to decision block 620, which determines whether the estimation of traffic intensity is greater than a calibrated traffic intensity threshold. As traffic intensity increases, the ability of the disclosed process to accurately track hidden vehicles posing a hazardous condition to the host vehicle decreases. In an example, if there are two vehicles approaching an intersection, and one is hidden, roaming cellular data from the hidden vehicle may be easily indicated and used to provide a vehicle alert. If there are ten vehicles approaching an intersection, and one is hidden, identifying the hidden vehicle among the roaming cellular signatures of the other nine vehicles may be more difficult or less precise. If decision block 620 determines that the estimation of traffic intensity is above the calibrated traffic intensity threshold, then high traffic action block 630 may advise the driver to use caution and/or suggest a different travel route to avoid the heavy traffic. The process flow ends at block 640.

Figure 9:
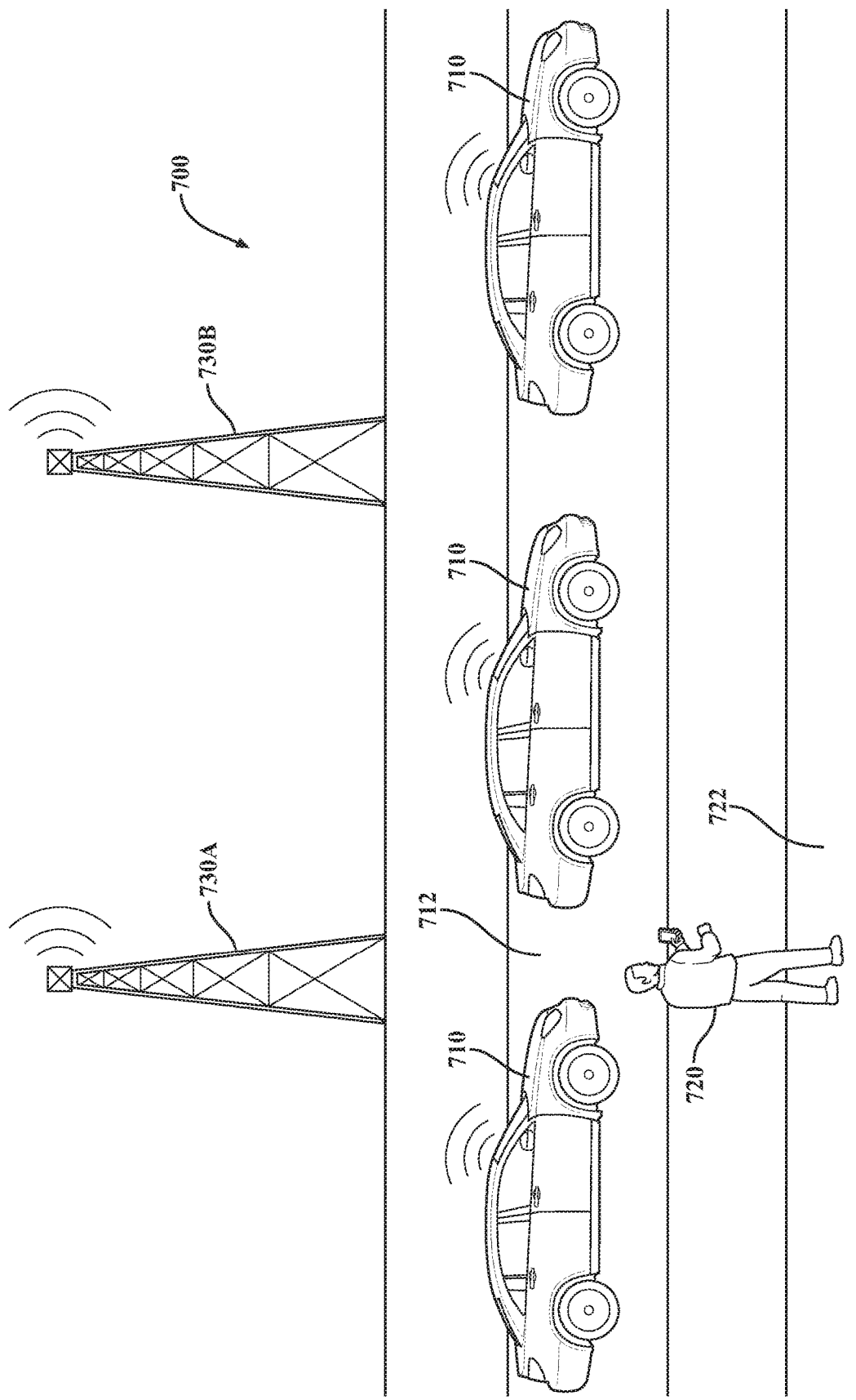
FIG. 9 schematically illustrates a plurality of cellular devices exchanging roaming mobile data with a plurality of cellular towers, in accordance with the present disclosure.

FIG. 9 schematically illustrates an exemplary plurality of cellular devices exchanging roaming mobile data with a plurality of cellular towers. Environment 700 is illustrated. Two vehicles 710 are illustrated upon roadway 712 including at least one mobile cellular device within each vehicle. A pedestrian 720 is illustrated upon pedestrian path 722 including a mobile cellular device. A vehicle 800 including a traffic flow estimation controller 30 is provided upon the roadway 712. A first cellular tower 730A and a second cellular tower 730B are illustrated in an area nearby roadway 712 and pedestrian path 722. Depending upon a number of factors including a distance of each mobile cellular device from each of the first cellular tower 730A and the second cellular tower 730B, each mobile cellular device may send GPS data and/or roaming cellular data to one of first cellular tower 730A and the second cellular tower 730B. Vehicle 800 may access information from the cloud and make determinations about each of the vehicles 710 and pedestrian 720 as described by the disclosed process.

Figure 10:
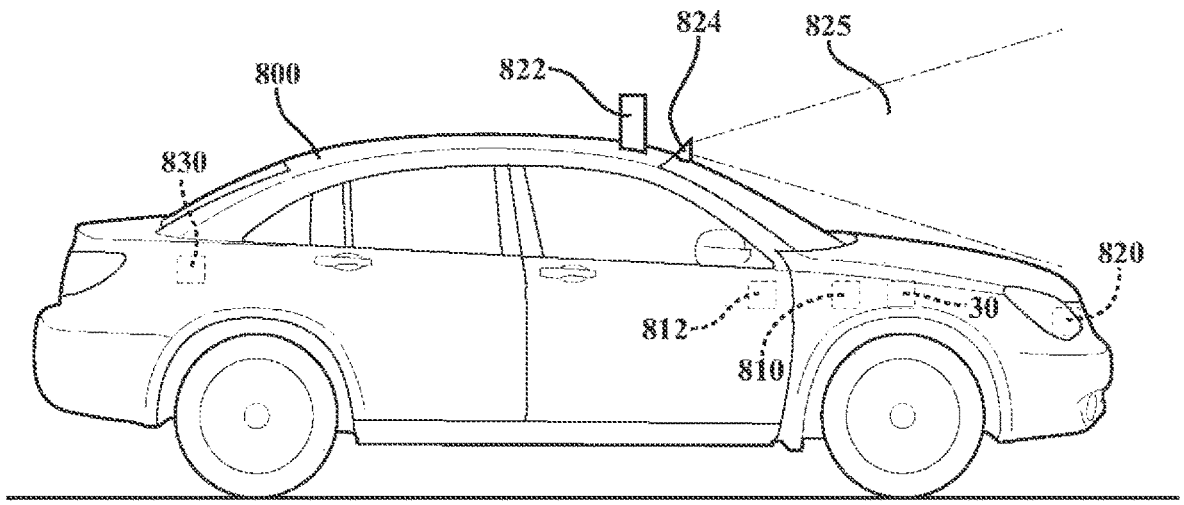
FIG. 10 schematically illustrates an exemplary vehicle system utilizing a computerized controller to approximate traffic, in accordance with the present disclosure.

FIG. 10 schematically illustrates an exemplary vehicle 800 utilizing a computerized traffic flow estimation controller 30 to approximate traffic. Vehicle 800 is illustrated including the traffic flow estimation controller 30, a GPS device 810, a navigation system 812, a radar device 820, a LIDAR device 822, a camera device 824, and a wireless communication device 830. The camera device 824 collects images within its field of view 825. The traffic flow estimation controller 30 utilizes information from the GPS device 810, the navigation system 812, the radar device 820, the LIDAR device 822, the camera device 824, and the wireless communication device 830 to approximate traffic and determine when to issue a vehicle alert as described herein.

Figure 11:
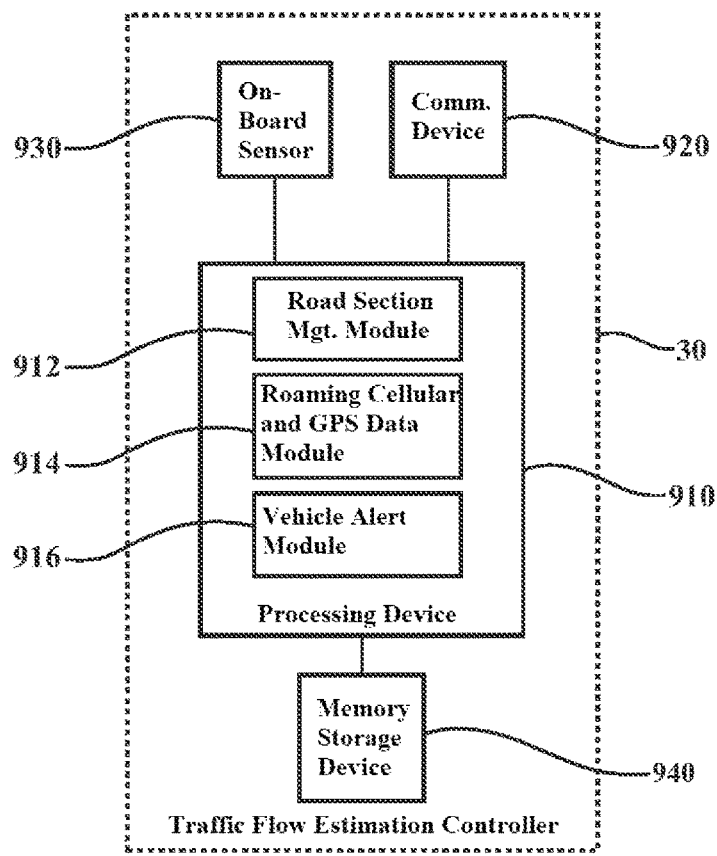
FIG. 11 schematically illustrates an exemplary computerized controller including programming operable to approximate traffic based upon cloud data, in accordance with the present disclosure.

FIG. 11 schematically illustrates an exemplary computerized traffic flow estimation controller 30 including programming operable to approximate traffic based upon cloud data. The computerized traffic flow estimation controller 30 includes a computerized processing device 910, a communications device 920, a vehicle on-board sensor device 930, and a memory storage device 940. It is noted that the computerized traffic flow estimation controller 30 may include other components and some of the components are not present in some embodiments.

The processing device 910 may include memory, e.g., read only memory (ROM) and random-access memory (RAM), storing processor-executable instructions and one or more processors that execute the processor-executable instructions. In embodiments where the processing device 910 includes two or more processors, the processors may operate in a parallel or distributed manner. The processing device 910 may execute the operating system of the traffic flow estimation controller 30. Processing device 910 may include one or more modules executing programmed code or computerized processes or methods including executable steps. Illustrated modules may include a single physical device or functionality spanning multiple physical devices. In the illustrative embodiment, the processing device 910 also includes a road section management module 912, a roaming cellular and GPS data module 914, and a vehicle alert module 916, which are described in greater detail below.

The communications device 920 may include a communications/data connection with a bus device configured to transfer data to different components of the system and may include one or more wireless transceivers for performing wireless communication.

The vehicle on-board sensor device 930 includes hardware and/or software configured to enable the processing device 910 to receive and/or exchange data with on-board sensors of the host vehicle.

The memory storage device 940 is a device that stores data generated or received by the traffic flow estimation controller 30. The memory storage device 940 may include, but is not limited to, a hard disc drive, an optical disc drive, and/or a flash memory drive.

The road section management module 912 may include programming operable to enable the processing device to monitor operation of the host vehicle, monitor a planned route of the host vehicle, and identify one or more road sections along the planned route that may include cross-traffic and/or merging traffic. Once identified, these road sections may be used to identify traffic approaching or within the road sections according to the disclosed process.

The roaming cellular and GPS data module 914 may include programming operable to access and analyze data related to mobile cellular devices in a nearby area or in an area close to a road section along a planned route of the host vehicle. The roaming cellular and GPS data module 914 may access GPS data from mobile cellular devices and utilize that GPS data to determine whether each of the mobile cellular devices represent traffic that may pose a hazardous condition to the host vehicle. The roaming cellular and GPS data module 914 may additionally or alternatively access roaming cellular data from nearby cellular towers. The roaming cellular and GPS data module 914 may utilize that roaming cellular data to identify nearby mobile cellular devices and determine whether each of the mobile cellular devices represent traffic that may pose a hazardous condition to the host vehicle. The roaming cellular and GPS data module 914 may additionally filter the accessed data and analysis, for example, eliminating data deemed to be related to a pedestrian not posing a hazardous condition to the host vehicle or eliminating redundant data related to multiple mobile cellular devices deemed to be collocated in a single vehicle.

The vehicle alert module 916 may include programming operable to compare a hazardous condition posed by identified traffic to a calibratable threshold, indicate a vehicle alert based upon the comparing, and command actions based upon the vehicle alert.

The traffic flow estimation controller 30 is provided as an exemplary computerized device capable of executing programmed code to operate the disclosed process. A number of different embodiments of the traffic flow estimation controller 30 and modules operable therein are envisioned, and the disclosure is not intended to be limited to examples provided herein.

Figure 12:
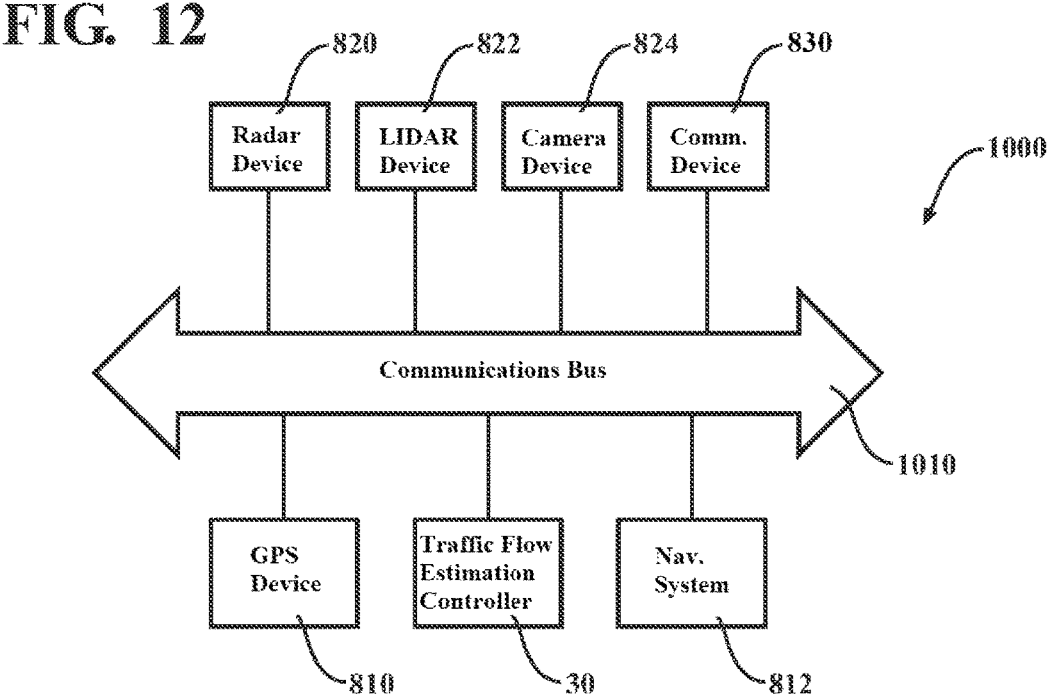
FIG. 12 schematically illustrates a system communication architecture operable to transmit data between devices, sensors, controllers and other electronic devices in the vehicle system of FIG. 10, in accordance with the present disclosure.

FIG. 12 schematically illustrates a system communication architecture 1000 operable to transmit data between devices, sensors, controllers and other electronic devices in the vehicle system of FIG. 10. The system communication architecture 1000 includes the communications bus 1010 operable to provide an ability for devices, sensors, controllers and other electronic devices in the system to electronically communicate.

The traffic flow estimation controller 30 is illustrated communicably connected to the communications bus 1010. Through the communications bus 1010, the traffic flow estimation controller 30 may monitor data from various sources including from the GPS device 810, the navigation system 812, the radar device 820, the LIDAR device 822, the camera device 824, and the wireless communication device 830.

Figure 13:
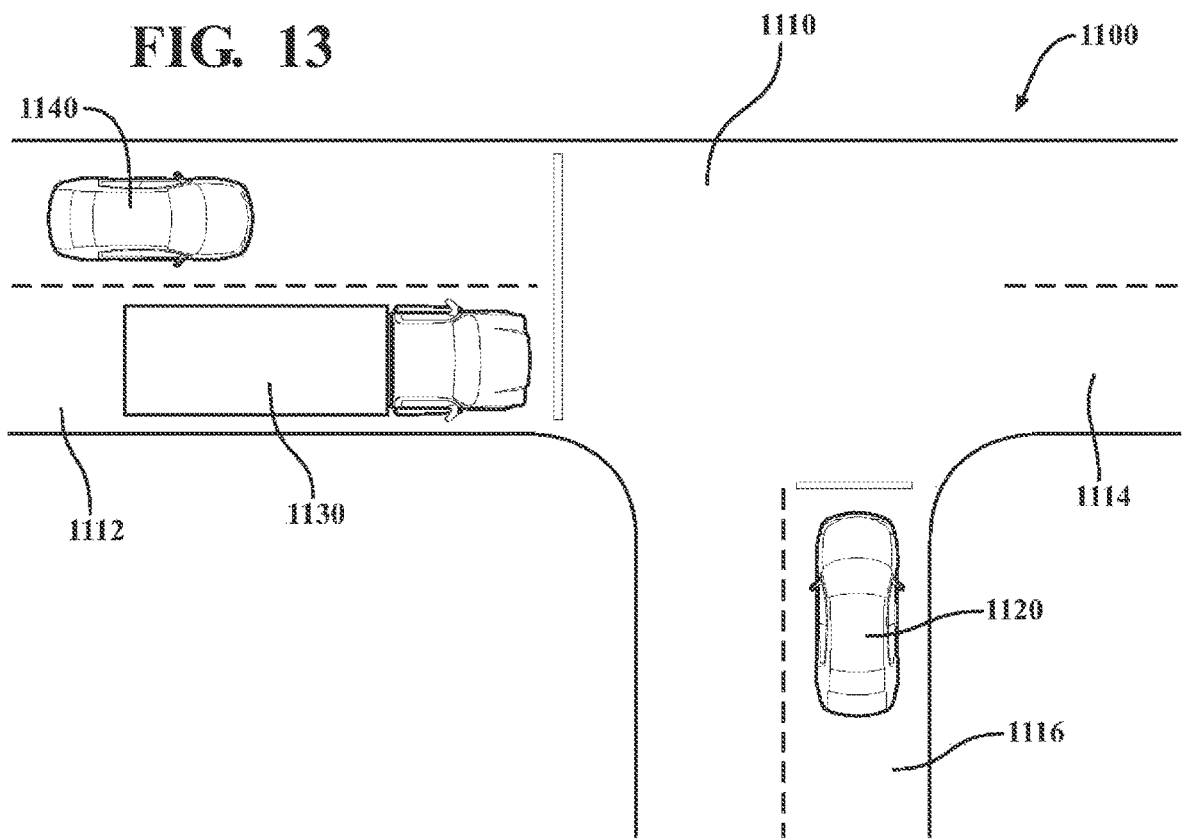
FIG. 13 illustrates an exemplary road section including a vehicle operating a process to approximate traffic based upon cloud data to avoid a hazardous condition, in accordance with the present disclosure.

FIG. 13 illustrates an exemplary road section 1100 including a vehicle 1120 operating a process to approximate traffic based upon cloud data to avoid a hazardous condition. The road section 1100 is illustrated including an intersection 1110 joining a first roadway 1116, a second roadway 1112, and a third roadway 1114. The vehicle 1120 includes a traffic flow estimation controller 30 as disclosed herein. The traffic flow estimation controller 30, analyzing a position and a planned route of the vehicle 1120 may identify road section 1100 as a road section including cross-traffic. Vehicles upon either of the second roadway 1112 and the third roadway 1114 may traverse intersection 1110 and potentially pose a hazardous condition for the vehicle 1120. The vehicle 1120 may include a camera device, a radar device, or a similar sensor device useful for collecting data regarding an environment surrounding the vehicle 1120. However, a large delivery truck 1130 is situated in the second roadway 1112 obscuring a view of the second roadway 1112 from sensors of the vehicle 1120. As a result, a hidden vehicle 1140 is obscured from sensors of the vehicle 1120. Delivery truck 1130 may be stopped at a traffic light or stopped intentionally in order to permit the vehicle 1120 to proceed into the intersection 1110. However, if the hidden vehicle 1140 does not stop, it will pose a hazardous condition to the vehicle 1120. By monitoring mobile cellular activity of an occupant of the hidden vehicle 1140, the traffic flow estimation controller 30 of the vehicle 1120 may indicate a vehicle alert to the driver of the vehicle 1120 and may intervene in the operation of the vehicle 1120, for example, commanding an autonomous braking operation to prevent the vehicle 1120 from entering the intersection 1110.

Priority of the one set of cloud data over another may be determined based upon confidence in the data. For example, if a mobile signal is changing towers in predefined directional sequence associated with the junction and there is no GPS based information, the process may prioritize the mobile based detection system. If the mobile signal is changing towers in a directional sequence associated with the junction and there is intermittent GPS information, the process may extrapolate the GPS information but assign lower priority to the GPS information system and high priority to the mobile detection system. If there is good GPS information, the process may prioritize GPS information system and lower priority of the mobile data-based system. In another example, if the GPS based information points direction of travel towards the junction and there is no mobile signal information, the process may prioritize the GPS information system. If the mobile signal information does not include data in the correct order to indicate an approach to the road section but the data indicates proximity to the road section, then the process may prioritize GPS information system and lower a priority of the mobile data-based system.

While the best modes for carrying out the disclosure have been described in detail, those familiar with the art to which this disclosure relates will recognize various alternative designs and embodiments for practicing the disclosure within the scope of the appended claims.

What is claimed is:

1. A process for local traffic approximation through analysis of cloud data, comprising:
   within a computerized traffic flow estimation controller of a host vehicle, operating programming to:
      monitor a planned navigational route of the host vehicle;
      detect along the planned navigational route a road section including cross-traffic which may pose an increased hazard to the host vehicle as compared to other road sections along the planned navigational route, wherein the road section including cross-traffic comprises a road section including merging traffic or an intersection of a first roadway along the planned navigational route upon which the host vehicle is planned to travel and a second roadway;
      monitor the cloud data related to a mobile cellular device disposed within a second vehicle, wherein the second vehicle is disposed within the road section including the cross-traffic and along the second roadway that is spaced from the planned navigational route;

analyze the cloud data related to the mobile cellular device disposed within the second vehicle to identify traffic posing a hazardous condition to the host vehicle within the road section including the cross-traffic; and generate a vehicle alert to a driver of the host vehicle based upon the identified traffic.

2. The process of claim 1, wherein monitoring the cloud data includes monitoring global positioning system data for the mobile cellular device; and wherein analyzing the cloud data includes identifying the second vehicle approaching the road section based upon movement of the mobile cellular device identified through the cloud data.

3. The process of claim 1, wherein monitoring the cloud data includes monitoring roaming cellular data acquired from a plurality of cellular towers; and wherein analyzing the cloud data includes identifying the second vehicle as approaching the road section based upon movement of the mobile cellular device identified through the cloud data.

4. The process of claim 3, wherein identifying the second vehicle approaching the road section based upon movement of the mobile cellular device includes estimating a speed of the mobile cellular device based upon a frequency that the mobile cellular device switches between the plurality of cellular towers or monitoring global positioning service data.

5. The process of claim 1, further comprising analyzing the cloud data to identify a number of vehicles approaching the road section.

6. The process of claim 1, wherein analyzing the cloud data to identify the traffic posing the hazardous condition includes filtering out data related to a pedestrian not posing the hazardous condition to the host vehicle.

7. The process of claim 1, wherein analyzing the cloud data to identify the traffic posing the hazardous condition includes filtering out redundant data related to a plurality of mobile cellular devices collocated in a single vehicle.

8. The process of claim 1, further comprising operating programming to:

monitor data from an on-board sensor of the host vehicle, wherein the on-board sensor includes at least a LIDAR sensor; and compare the data from the on-board sensor of the host vehicle to the cloud data; and wherein generating the vehicle alert to the driver of the host vehicle is further based upon the comparing indicating that the cloud data is related to the second vehicle obscured from the on-board sensor by an object located between the second vehicle and the on-board sensor.

9. The process of claim 1, further comprising operating programming to command autonomous braking based upon the vehicle alert.

10. The process of claim 1, further comprising: calculating a time to meet for the second vehicle and the host vehicle; and identifying the second vehicle as posing the hazardous condition based upon the time to meet.

11. The process of claim 1, further comprising applying a machine learning algorithm to estimate traffic intensity for the road section.

12. The process of claim 11, further comprising operating programming to warn the driver based upon the estimated traffic intensity for the road section.

13. A system for local traffic approximation through analysis of cloud data, comprising:

a computerized traffic flow estimation controller of a host vehicle, operating programming to:

monitor a planned navigational route of the host vehicle;

detect along the planned navigational route a road section including cross-traffic which may pose an increased hazard to the host vehicle as compared to other road sections along the planned navigational route, wherein the road section including cross-traffic comprises a road section including merging traffic or an intersection of a first roadway along the planned navigational route upon which the host vehicle is planned to travel and a second roadway;

monitor the cloud data related to a mobile cellular device disposed within a second vehicle, wherein the second vehicle is disposed within the road section including the cross-traffic and along the second roadway that is spaced from the planned navigational route;

analyze the cloud data related to the mobile cellular device disposed within the second vehicle to identify traffic posing a hazardous condition to the host vehicle within the road section including the cross-traffic; and generate a vehicle alert to a driver of the host vehicle based upon the identified traffic.

14. The system of claim 13, further comprising an on-board sensor of the host vehicle operable to provide data related to an environment around the host vehicle, wherein the on-board sensor includes at least a LIDAR sensor; and wherein the computerized traffic flow estimation controller further includes programming to:

monitor data from the on-board sensor;

compare the data from the on-board sensor to the cloud data; and identify the second vehicle as being hidden by an object located between the second vehicle and the on-board sensor based upon the comparing indicating that the second vehicle is obscured from the on-board sensor.

15. The system of claim 13, wherein the programming to monitor the cloud data related to the mobile cellular device includes programming to monitor global positioning service data.

16. The system of claim 13, wherein the programming to monitor the cloud data related to the mobile cellular device includes programming to monitor roaming cellular data acquired from a plurality of cellular towers.

17. A process for local traffic approximation through analysis of cloud data, comprising:

within a computerized traffic flow estimation controller of a host vehicle, operating programming to:

monitor a planned navigational route of the host vehicle;

detect along the planned navigational route a road section including cross-traffic which may pose an increased hazard to the host vehicle as compared to other road sections along the planned navigational route, wherein the road section including cross-traffic comprises a road section including merging traffic or an intersection of a first roadway along the planned navigational route upon which the host vehicle is planned to travel and a second roadway;

monitor the cloud data related to a mobile cellular device disposed within a second vehicle, wherein the second vehicle is disposed within the road section including the cross-traffic and along the second roadway that is spaced from the planned navigational route, the cloud data including one of global positioning service data or roaming cellular data acquired from a plurality of cellular towers;

analyze the cloud data related to the mobile cellular device disposed within the second vehicle to identify the second vehicle as posing a hazardous condition to the host vehicle within the road section including the cross-traffic; and generate a vehicle alert to a driver of the host vehicle based upon the second vehicle.

18. The process of claim 17, wherein analyzing the cloud data to identify the second vehicle as posing the hazardous condition includes filtering out data related to a pedestrian not posing the hazardous condition to the host vehicle.

19. The process of claim 17, wherein analyzing the cloud data to identify the second vehicle as posing the hazardous condition includes filtering out redundant data related to a plurality of mobile cellular devices collocated in a single hidden vehicle.

20. The process of claim 17, further comprising applying a machine learning algorithm to estimate traffic intensity for the road section.

* * * * *